United States Patent Office 2,861,298
Patented Nov. 25, 1958

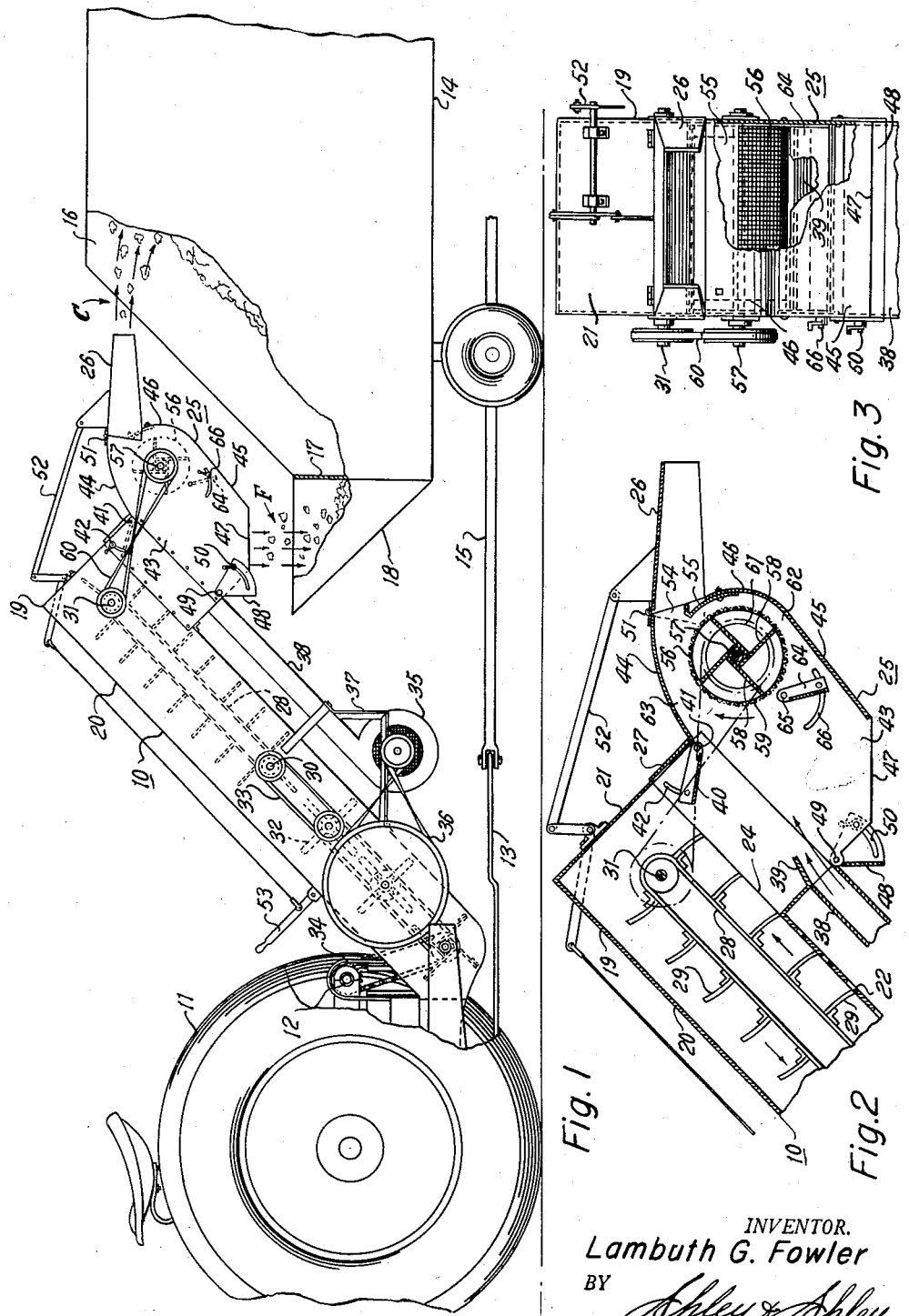

2,861,298

SEPARATORS FOR COTTON HARVESTERS

Lambuth G. Fowler, Lubbock, Tex.

Application January 16, 1956, Serial No. 559,324

5 Claims. (Cl. 19—72)

This invention relates to new and useful improvements in separators for cotton harvesters.

One object of the invention is to provide an improved separator for a cotton harvester for more efficiently separating mature cotton from green cotton, unopened and partially opened bolls and other foreign matter of greater specific gravity than the mature cotton.

Am important object of the invention is to provide an improved separator for receiving cotton and foreign matter from the discharge elevator of a cotton harvester and having an air stream for separating mature cotton from foreign matter of greater specific gravity together with means for impeding the travel of the foreign matter so as to impart reverse movement thereto for separating intermingled mature cotton therefrom and permitting separate discharge of said foreign matter and mature cotton.

A particular object of the invention is to provide an improved separator, of the character described, wherein the impeding means coacts with the air stream and includes rotating means for imparting whirling movement to the foreign matter of greater specific gravity so as to permit the same to drop out and be separated from the mature cotton.

Another object of the invention is to provide an improved separator, of the character described, having a rotary cylinder for separating mature cotton from foreign matter of greater specific gravity and means for creating a substantially radial movement of air outwardly of the cylinder to prevent clinging of cotton thereto together with baffle means adjacent said cylinder and coacting therewith to deflect and direct the foreign matter toward a point of separate discharge.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a side elevational, partly in section, of a separator constructed in accordance with the invention and mounted on the elevator of a tractor-mounted, cotton harvester, Fig. 2 is a longitudinal, sectional view of the separator and the upper portion of the elevator, and Fig. 3 is a rear elevational view, partly in section, of the separator and upper elevator portion.

In the drawing, the numeral 10 designates the rearwardly and upwardly inclined elevator of a cotton harvester which is shown as the type adapted to be mounted on a tractor 11. Only the rear portion of the tractor, its power take-off 12, its hitch member 13 and the relationship of the elevator 10 thereto are illustrated. A trailer or wagon 14, having its tongue 15 connected to the hitch member 13, is provided for receiving cotton and foreign matter from the elevator and includes upright side walls 16 and an extremely low front wall 17.

Although the mature cotton is directed into the trailer 14 as shown by the letter C, the foreign matter of greater specific gravity is discharged as shown by the letter F into a suitable bin 18 carried by the front wall 17 of said trailer. The mature cotton is substantially free from burrs, stems, stalks, rocks, dirt clouds, unopened or green and partially opened bolls and other trash, all of which may be referred to as foreign matter.

The elevator 10 includes an elongated rectangular casing or housing 19 having side and top walls 20, an upper end wall 21 and a foraminous bottom wall or screen 22 (Fig. 2). As shown in Fig. 1, the lower end of the elevator housing is suitably connected to the harvester at the rear end of the tractor 11. A rectangular discharge opening 24 is provided at the upper end of the bottom wall 22 and is directed rearwardly in overlying relation to the bin 18. The opening 24 communicates with the housing of an underlying separator 25 which projects rearwardly from the underside of the housing 19 and which has a nozzle 26 at its upper, rear end for directing mature cotton into the trailer 14. Preferably, a rectangular collar or transition 27 connects the separator 25 to the housing. An endless conveyor 28, having the usual blades or paddles 29, extends longitudinally of the housing and is mounted on transverse shafts 30 and 31 for carrying cotton and foreign matter from the harvester to the discharge opening. Due to the foraminous bottom wall or screen 22, a large portion of the dirt and other fine trash drops out before reaching the opening 24.

As shown in broken lines in Fig. 1, a beater mechanism 32 may be mounted in the lower end of the elevator housing and be connected to the lower shaft 30 of the conveyor 28 by a belt and pulley drive 33. For actuating the conveyor and beater mechanism, a suitable chain and sprocket drive 34 extends between said mechanism and the power take-off 12. It is noted that the beater mechanism forms no part of the present invention and that the conveyor may extend to the lower end of the housing.

A blower 35, having a belt and pulley drive 36, is suspended from the intermediate portion of the elevator housing by suitable mounting means 37 and has a duct 38 extending upwardly therefrom to the collar 27 in spaced relation to the bottom wall 22 of said housing. The blower and duct are adapted to direct a current or stream of air into the separator 25 for separating mature cotton from the foreign matter of greater specific gravity and discharging the cotton through the nozzle 26 into the trailer 14 as shown at C in Fig. 1. A deflector 39 overlies the upper end of the duct 38 and is disposed within the collar to prevent foreign matter from falling into said duct as well as to provide a nozzle for directing the air stream through the separator to the discharge nozzle (Fig. 2). It is noted that the upper end of the duct has its lower margin terminating at the juncture of the collar with the separator. Opposite the air nozzle 39, an adjustable baffle or deflector 40 of the usual plate type is pivotally mounted at the lower, rear end of the collar as shown at 41 and has conventional adjusting means 42. The baffle extends upwardly and forwardly within the collar to control the direction of the cotton and foreign matter discharged from the conveyor into the separator 25 and to prevent the air stream from entering the elevator housing 19 through the opening 24 by deflecting the same downwardly into said separator.

As shown most clearly in Fig. 2, the separator includes upright side walls 43 depending from the collar, an arcuate or curved top wall 44 extending rearwardly from said collar and an inclined bottom wall 45 having an upwardly curved rear portion forming an arcuate end wall 46. A rectangular opening 47 for discharging foreign matter into the bin 18, as shown at F in Fig. 1, is formed in the lower, front end of the bottom wall 45. For closing the front end of the separator and varying the size of the discharge opening 47, an adjustable baffle 48 is pivotally mounted at and is suspended from the juncture 49 of the separator with the collar and the duct 38. The baffle 48 is substantially U-shaped in cross-section and has conventional adjusting means 50.

The top wall 44 extends from the pivotal mounting 41 of the baffle 40 and has the nozzle 26 hinged to its rear end as shown at 51 whereby said nozzle is adjustable to vary the elevation and distance of travel of the cotton discharged at C. For adjusting and maintaining the discharge nozzle in adjusted positions, a suitable linkage 52 is provided and includes a lever 53 adjacent the lower end of the elevator 10 at the rear end of the tractor 11. The nozzle is U-shaped in cross-section or hood-like, having an open bottom, and converges toward its rear end (Fig. 3). An opening 54 for the discharge nozzle is provided by terminating the upper margin of the end wall 46 below the top wall, the size of the opening being varied by an arcuate baffle 55 adjustably mounted on said end wall.

In order to separate most of the foreign matter of greater specific gravity from the cotton prior to the discharge of the latter through the nozzle 26, a rotary cylinder or member 56 is disposed transversely within the rear portion of the separator 25 adjacent its curved end wall 46. The cylinder 56 includes an axial shaft 57 having longitudinal fan blades or means 58 extending tangentially therefrom and supporting a circumferential screen or foraminous peripheral member 59 at their extremities in concentric relation to the shaft. A belt and pulley drive 60 connects the shaft 57 to the upper conveyor shaft 31 for rotating the cylinder 56 in a clockwise direction, and coaxial, circular openings 61 are formed in the side walls 43 in communication with said cylinder. As shown by the numeral 62, the cylinder is spaced in concentric relation to the curved end wall so as to form an arcuate passage of substantially constant dimension therebetween and is spaced a greater distance below the top wall to provide a larger passage 63 therebetween. It is noted that the cylinder is disposed rearwardly of the collar 27 so that the major portion of the separator is substantially unobstructed and that the fan blades 58 and air inlet openings 61 may be omitted. For coacting with the cylinder, an adjustable baffle or deflector 64 is mounted between the front peripheral portion of said cylinder and the bottom wall 45. As shown at 65, the upper margin of the baffle is pivotally supported adjacent the cylinder with its lower margin being spaced from the bottom wall. The baffle 64 has conventional adjusting means 66 and extends in transverse relation to the air nozzle 39 and the discharge opening 24.

In operation, the air stream emitted by the duct 38 flows through the upper portion of the separator, over the cleaning cylinder 56 and through the passage 63, opening 54 and nozzle 26 across the path of the cotton and foreign matter discharged from the conveyor 28 through the opening 24 into said separator. Due to its discharge velocity, the majority of the cotton and foreign matter strikes the cylinder and the baffle 64 and the foreign matter of greater specific gravity, such as green or unopened bolls, larger stalks, dirt clods and rocks are deflected forwardly and downwardly toward the inclined bottom wall 45 for discharge through the opening 47, as shown at F in Fig. 1.

The velocity of the air stream is sufficient to entrain and carry the relatively light weight, mature cotton to the nozzle 26 for discharge into the trailer 14, as shown at C in Fig. 1. It is noted that portions of the air stream strike the baffle 40 as well as the cylinder 56 and baffle 64 for creating a turbulence within the medial portion of the separator, whereby the partially opened bolls and lighter foreign matter, such as burrs, smaller stalks, stems and some dirt clods, are whirled or rolled and suspended in the vicinity of said air stream. This whirling action momentarily accumulates a roll of cotton and foreign matter which retards discharge and permits dropping out and separation of an appreciable quantity of the foreign matter intermingled with the cotton and a consequent lightening of said cotton. Due to the inclined bottom wall 45, the foreign matter is directed to the discharge opening 47. Since it is of less specific gravity, the mature cotton is entrained or picked up and carried rearwardly through the passage 63 by the air stream. In addition to preventing the air stream from entering the elevator housing 19, the baffle 40 also deflects the cotton downwardly to prevent the same from reentering said elevator housing.

Although the major portion of the cotton passes through the passage 63 and is discharged, the velocity of the air stream is insufficient to suspend the foreign matter intermingled with said cotton during its travel through said passage. Most of the foreign matter falls by gravity onto the screen 59 of the cylinder 56 and is carried around said cylinder through the passage 62 and slides down the bottom wall beneath the baffle 64 to the opening 47. Since the fan blades 58 draw air through the openings 61 into the cylinder, a substantially radial movement of air outwardly of said cylinder is provided for blowing the cotton away from said cylinder so as to overcome the tendency of said cotton to cling to the screen. Also, the removal of the cotton from the screen is assisted by the air stream striking the upper portion of the cylinder. By adjusting the arcuate baffle 55, the size of the cotton discharge opening 54 may be varied to control the amount of foreign matter retained in the separator and directed downwardly around the cylinder. It is noted that the baffle 64 coacts with the cylinder to provide means for impeding the discharge of the cotton and foreign matter and imparting reverse movement thereto whereby the major portion of the foreign matter is separated by gravity from the mature cotton. Of course, the air stream constantly tends to lift or pick up the cotton so as to assist the separation of foreign matter therefrom. It is noted that the fan blades 58 and air inlet openings 61 may not be essential and may be omitted when the rotating cylinder is sufficient to separate the foreign matter from the mature cotton.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In combination with a cotton harvester having an upwardly inclined elevator with a discharge opening at its upper end for directing mature cotton, immature cotton and other foreign matter downwardly and rearwardly from the elevator, a separator including a housing extending rearwardly from the elevator and communicating with its discharge opening for receiving the cotton and foreign matter therefrom, the housing having an opening in its lower front end for discharging immature cotton and other foreign matter and an opening in its upper rear end for discharging mature cotton, means for directing a stream of air rearwardly through said housing and its rear opening from a point between its front opening and the elevator opening whereby the air stream passes transversely and upwardly through the cotton and foreign matter discharged from the elevator opening for entraining mature cotton therein, a substantially horizontal rotary cylinder in said housing between its rear opening and the elevator opening and having its upper portion in the path of discharge from the elevator opening for impeding the movement of the cotton and foreign matter through said housing by imparting reverse movement to the foreign matter and immature cotton so as to permit said foreign matter and immature cotton to drop out and separate from the mature cotton for discharge through the front opening of said housing, and drive means for rotating the cylinder, said housing having a rear wall between its front and rear openings and spaced from said cylinder to provide a passage for directing foreign matter and immature cotton around said cylinder to said front opening.

2. The combination set forth in claim 1 wherein the rotatable cylinder is disposed adjacent the upper rear opening of the separator housing and is spaced from the discharge opening of the elevator, and adjustable means carried by the rear wall for varying the size of said rear opening to control the amount of foreign matter retained in said housing.

3. The combination set forth in claim 1 including deflecting means below and forwardly of the rotatable cylinder for coacting therewith to direct foreign matter and immature cotton toward the front opening of the housing.

4. The combination set forth in claim 1 wherein the rotatable cylinder includes fan means, and means for supplying air thereto for creating a substantially radial movement of air outwardly of said member for dislodging mature cotton therefrom.

5. The combination set forth in claim 1 wherein the rotary cylinder is foraminous and has at least one end communicating with the exterior of the separator housing, and fan blades within said cylinder for drawing air thereinto and directing the air substantially radially outwardly of said cylinder for dislodging mature cotton therefrom.

References Cited in the file of this patent

UNITED STATES PATENTS

| | | |
|---|---|---|
| 754,729 | White | Mar. 15, 1904 |
| 2,645,821 | Fowler | July 21, 1953 |